(12) United States Patent
Ertel, Jr.

(10) Patent No.: US 6,179,112 B1
(45) Date of Patent: Jan. 30, 2001

(54) ARTICLE REORIENTATION MECHANISM

(75) Inventor: Daniel A. Ertel, Jr., Oconomowoc, WI (US)

(73) Assignee: Dorner Mfg. Corp., Hartland, WI (US)

( * ) Notice: Under 35 U.S.C. 154(b), the term of this patent shall be extended for 0 days.

(21) Appl. No.: 09/146,566

(22) Filed: Sep. 3, 1998

(51) Int. Cl.[7] .......................... B65G 47/24; B65G 47/26
(52) U.S. Cl. ............................................. 198/411; 198/456
(58) Field of Search .................................. 198/411, 394, 198/395, 456

(56) References Cited

U.S. PATENT DOCUMENTS

| | | | |
|---|---|---|---|
| 2,343,521 | * 3/1944 | Benning | 198/411 |
| 3,033,341 | * 5/1962 | Cromeens | 198/456 |
| 3,592,326 | * 7/1971 | Zimmerle et al. | 198/394 |
| 4,951,803 | 8/1990 | Dorner et al. . | |
| 4,993,656 | 2/1991 | Dorner . | |
| 5,000,656 | 3/1991 | Dorner et al. . | |
| 5,002,457 | 3/1991 | Dorner et al. . | |
| 5,030,058 | 7/1991 | Dorner et al. . | |
| 5,097,936 | 3/1992 | Dorner et al. . | |
| 5,586,685 | 12/1996 | Dorner et al. . | |

* cited by examiner

*Primary Examiner*—Robert P. Olszewski
*Assistant Examiner*—Bryan Jaketic
(74) *Attorney, Agent, or Firm*—Andrus, Sceales, Starke & Sawall, LLP

(57) ABSTRACT

A mechanism for reorienting an article moving along a conveyor assembly. Articles such as video cassette containers, compact disc containers, or audio cassettes, enter an article reorientation mechanism on their face surface. The face surface of each article is supported by a conveyor belt of a primary conveyor assembly. The primary conveyor assembly moves the article from an upstream location toward a downstream location. A guide assembly forces the article toward a lateral edge of the conveyor belt of the primary conveyor assembly. A transfer conveyor assembly extends upwardly at an angle from the lateral edge of the primary conveyor assembly to receive the article as it is pushed off the primary conveyor assembly by the guide assembly. A twist guide plate is positioned downstream from the transfer conveyor assembly for receiving the article from the transfer conveyor assembly and tipping the article upright onto its side surface. The article is then supported on its side surface on the primary conveyor assembly and transferred downstream to an outfeed conveyor. The primary conveyor assembly, transfer conveyor assembly, and guide assembly operate at substantially identical speeds.

21 Claims, 3 Drawing Sheets

ARTICLE REORIENTATION MECHANISM

BACKGROUND OF THE INVENTION

Conveying systems are often employed to convey articles through a series of working stations. In certain conveyor systems, a number of different articles are separately stacked in a series of individual dispensers mounted along a moving conveyor. Through operation of a computer program, individual articles are selectively dispensed from the dispensers onto the moving conveyor, and the articles are then conveyed to a location where they can be packaged for shipment to the customer.

Typically, the articles are generally rectangular and include a pair of relatively wide flat face surfaces and an outer peripheral edge defined by relatively narrow individual side surfaces. The articles are fed by the dispensers onto the conveyor such that the face surface of each article contacts the conveyor. Since the articles are typically dropped onto the conveyor, the wider face surface provides stable support for the article on the conveyor. Downstream from the dispensers, the individual articles are typically assembled into a stack, with each individual article resting on one of its side surfaces as the stack of articles is assembled. Therefore, each of the articles must be reoriented from its face surface to one of its side surfaces before the stack can be assembled.

In the past, stationary guide members were positioned in relation to the moving conveyor such that the stationary guide members caused the article to be reoriented onto one of its side surfaces. However, conveying systems in which stationary guide members reorient the article entail certain drawbacks. For example, when the article slides along the stationary guide members, the guide members can wear off printing on the article and can mar or scrape the surface of the article.

SUMMARY OF THE INVENTION

The present invention is directed to a mechanism for reorienting articles supported on a moving conveyor from a face surface of the article to a side surface of the article. A plurality of articles, such as video cassette containers, compact disc containers, audio cassette containers, or the like, are conveyed along a moving infeed conveyor in a generally flat position, such that the face surface of the article is supported on the infeed conveyor. An article reorientation mechanism of the present invention receives each of the individual articles on a primary conveyor assembly. The primary conveyor assembly includes a moving primary conveyor belt extending between an upstream end and a downstream end of the primary conveyor assembly. The primary conveyor belt includes an upper, conveyor surface that is preferably located in a generally horizontal plane. As one of the articles enters the article reorientation mechanism, the face surface of the article is supported by the generally horizontal conveyor surface of the primary conveyor belt.

The primary conveyor assembly moves the article from the upstream end to the downstream end of the article reorientation mechanism. A guide assembly, preferably including a guiding conveyor belt, is positioned to extend across a portion of the primary conveyor belt included in the primary conveyor assembly. An angled portion of the guide assembly extends across the primary conveyor assembly at an angle from one lateral edge of the primary conveyor belt to a location near the opposite lateral edge. As the article moves along the primary conveyor assembly, the angled portion of the guide assembly forces the article laterally across the primary conveyor assembly toward the lateral edge of the primary conveyor belt.

A transfer conveyor assembly is positioned adjacent to the lateral edge of the primary conveyor assembly. The transfer conveyor assembly includes a transfer conveyor belt having a transfer surface. Preferably, the transfer surface of the transfer conveyor assembly is positioned at an angle relative to the generally horizontal conveyor surface of the primary conveyor assembly. The guide assembly thus forces the article onto the transfer conveyor assembly, where the article is supported at an angle relative to horizontal.

A twist guide member is positioned downstream from the transfer conveyor assembly. The twist guide member receives the article leaving the transfer conveyor assembly and tips the article onto one of its side surfaces. After being tipped by the twist guide member, the side surface of the article is supported on the primary conveyor assembly. Guide rails are positioned downstream of the twist guide member for maintaining the article on its side surface upon discharge from the primary conveyor assembly.

In accordance with the invention, the primary conveyor assembly, the guide assembly, and the transfer conveyor assembly all operate at substantially the same speed. In this manner, the article reorientation mechanism of the invention prevents damage to the article by eliminating sliding of the article along a stationary surface.

It is an object of the invention to provide an article reorientation mechanism that can receive a stream of single articles supported on their face surfaces and reorient each article onto a side surface. It is an additional object of the invention to provide an article reorientation mechanism that includes a transfer conveyor assembly operated at substantially the same speed as the primary conveyor assembly to reduce damage to the article being transported. It is another object of the invention to provide a guide assembly including a guiding conveyor belt operated at substantially the same speed as the primary conveyor assembly to prevent damage to the article. It is a further object of the invention to provide a twist guide plate member that tips the article from an angled position to an upright position on the primary conveyor assembly. A still further object of the invention is to provide an article reorientation mechanism which is relatively simple in its construction and operation, and which is readily adapted for use in an overall article conveying assembly.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
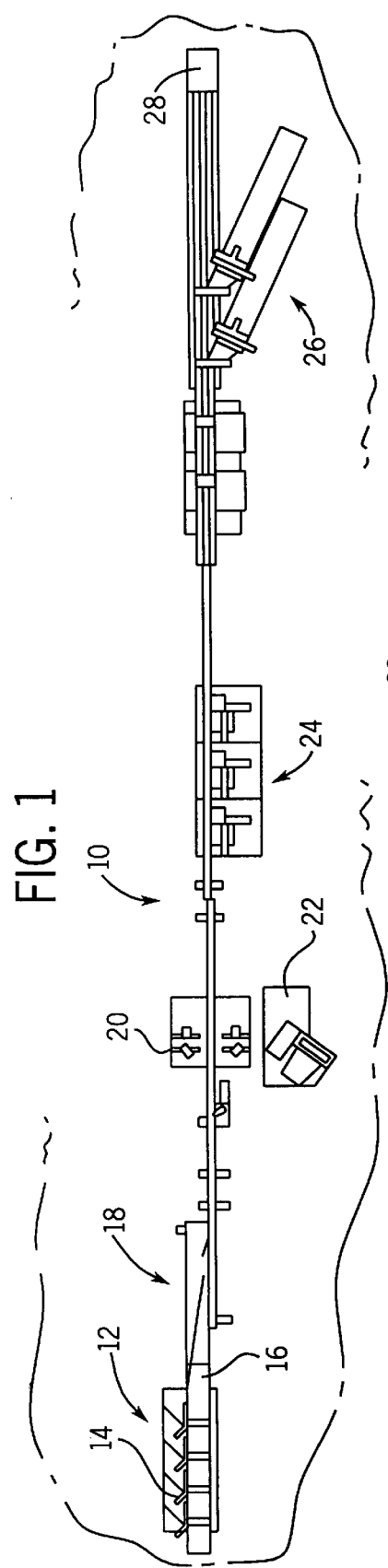
FIG. 1 is a top plan view of an article sorting and conveying system incorporating the article reorienting mechanism of the present invention.

FIG. 1 illustrates an article sorting and conveying system 10 that dispenses separately stacked articles and conveys the articles to a location where they can be packaged for shipment. The article sorting and conveying system 10 generally includes a dispensing section 12 that includes a series of dispensers 14 that dispense articles onto an infeed conveyor 16. The dispensing section 12 can include a plurality of dispensers 14, each of which may contain a different type of article, such as video tapes, compact discs, audio cassettes or the like, or a series of different articles of the same type. The detailed construction of each individual dispenser 14 is shown and described in commonly owned U.S. Pat. No. 5,586,685, incorporated herein by reference.

The articles are individually dispensed onto the infeed conveyor 16 such that the flat face surface of the article rests upon the infeed conveyor 16. Once dispensed onto the infeed conveyor 16, the articles are moved downstream to a reorientation section 18 where the individual articles are repositioned onto one of their side surfaces by a mechanism and method to be discussed in greater detail below.

After each article has passed through the reorientation section 18, the article continues to move downstream and passes through a bar code reader 20 that is able to accurately and quickly identify the article being moved by the article sorting and conveying system 10. A computer operating station 22 allows an operator to control the operation of the article sorting and conveying machine 10.

Once the individual article has been identified by the bar code reader 20, the article enters a labeling section 24 that can apply various types of labels or stickers to the article moving through the article sorting and conveying system 10. After leaving the labeling section 24, the individual article is diverted into one of a plurality of stacker mechanisms 26 depending on the article required by each of the individual stacker mechanisms. The stacker mechanisms 26 allow several individual stacks to be assembled simultaneously. Each of the stacker mechanisms 26 assembles a stack of articles, each of which is resting on its side surface. If the stacker mechanisms 26 do not require the individual article passing along the article sorting and conveying system 10, the article is collected in a storage container 28 positioned at the downstream end of the article sorting and conveying system 10.

Figure 2:
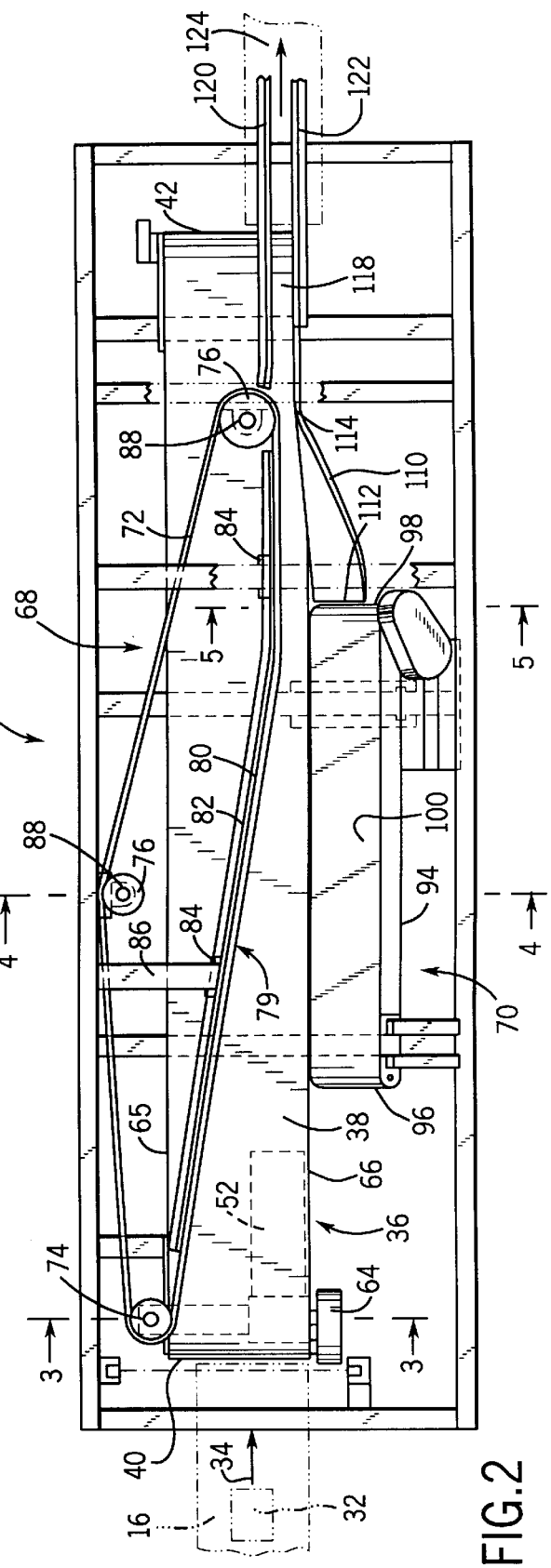
FIG. 2 is a top plan view of the article reorienting mechanism of the present invention.
Figure 3:
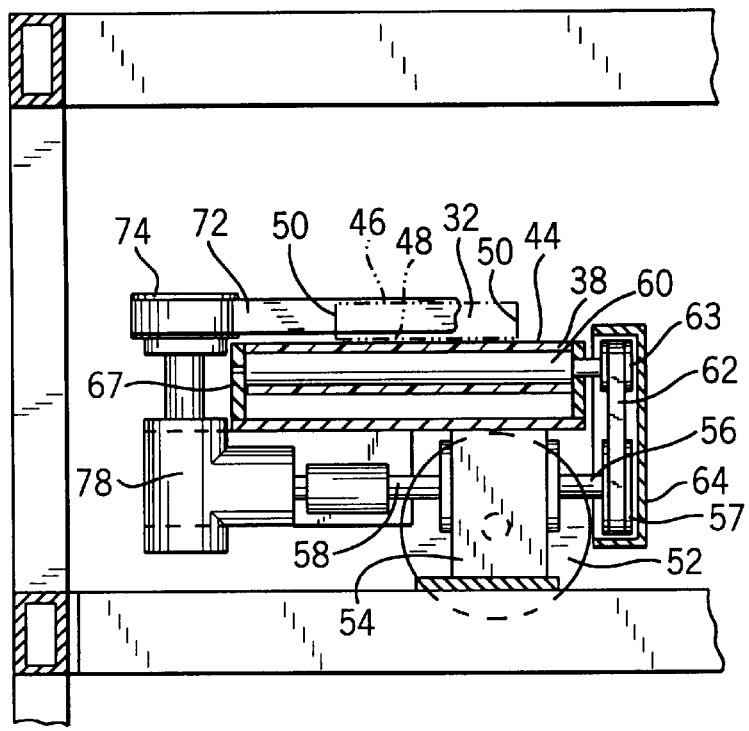
FIG. 3 is a sectional view taken along line 3—3 of FIG. 2.

FIG. 2 illustrates an article reorientation mechanism 30 that is included in the reorientation section 18 of the article sorting and conveying system 10. The article reorientation mechanism 30 receives an article 32 from the infeed conveyor 16 in the direction shown by arrow 34. After leaving the infeed conveyor 16, the article 32 moves onto a primary conveyor assembly 36. The primary conveyor assembly 36 includes an endless primary conveyor belt 38 extending between an upstream end 40 and a downstream end 42 of the article reorientation mechanism 30, as can be seen in FIGS. 2 and 3. The primary conveyor belt 38 includes an upper conveyor run 44 that supports the article 32.

As can be seen in FIG. 3, the article 32 is a generally rectangular member having a pair of relatively wide face surfaces 46 and 48 and an outer peripheral edge defined by a series of relatively narrow side surfaces 50. As shown in FIG. 3, when the article 32 initially is supported on the primary conveyor belt 38 near the upstream end 40, the face surface 48 is in contact with the upper conveyor run 44. In the preferred embodiment of the invention, the conveyor run 44 is contained in a generally horizontal plane.

The primary conveyor assembly 36 is driven by a motor 52. The motor 52 is coupled to a gear box 54 that includes a first drive shaft 56 and a second drive shaft 58. A drive pulley 57 is mounted to the first drive shaft 56, and drive pulley 57 is coupled to a drive roller 60 through a belt 62 and a driven pulley 63, such that the rotation of the first drive shaft 56 is transferred to rotation of the drive roller 60 through the belt 62. A shield member 64 surrounds the belt 62 to maintain engagement of the belt with the drive pulley 57 and the driven pulley 63.

Figure 4:
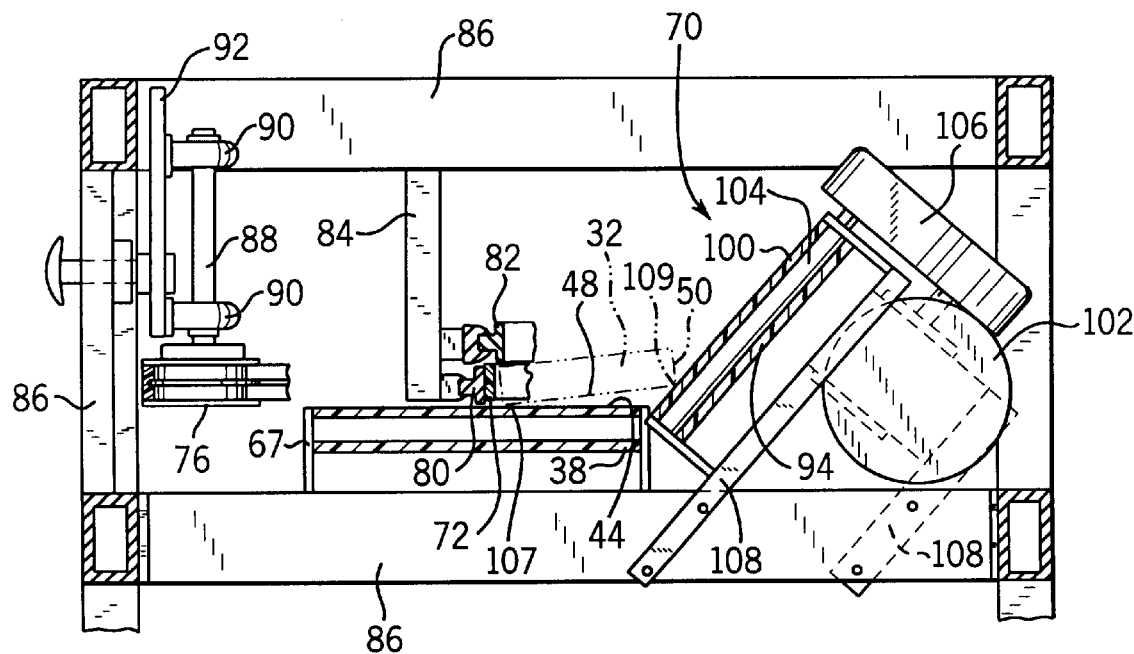
FIG. 4 is a sectional view taken along line 4—4 of FIG. 2.
Figure 5:
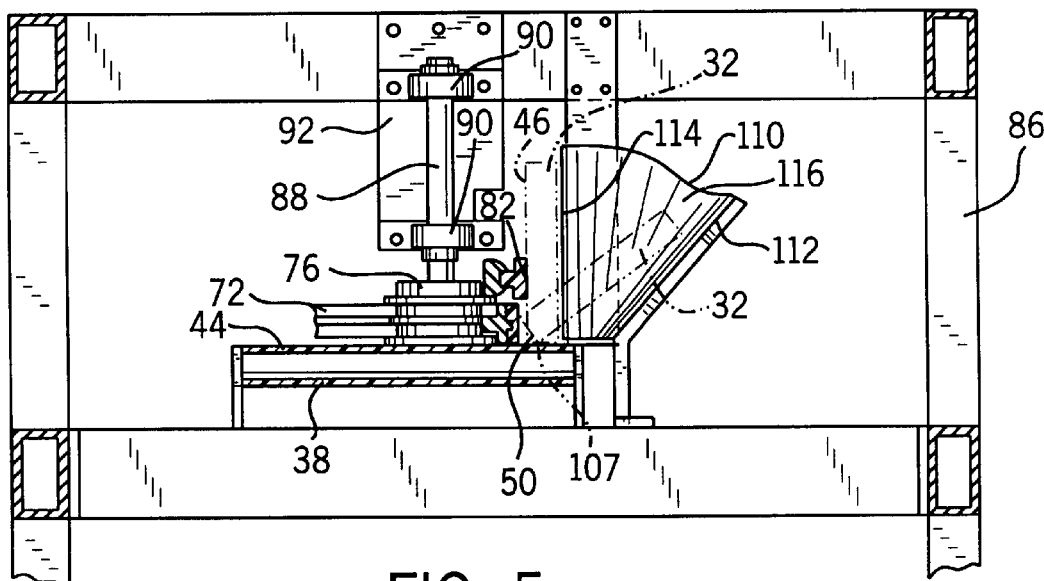
FIG. 5 is a sectional view taken along line 5—5 of FIG. 2.

As can be seen in FIG. 2, the primary conveyor belt 38 has a lateral width defined by a pair of opposed lateral edges 65 and 66. The lateral edges 65 and 66 of the primary conveyor belt 38 are spaced slightly inward from side rails 67, as shown in FIGS. 3–5.

As the article 32 moves along the primary conveyor assembly 36 toward the downstream end 42, the article 32 comes into contact with a guide assembly 68. The guide assembly 68 functions to force the article 32 laterally across the conveyor surface 44 toward the lateral edge 66 of the primary conveyor belt 38. As shown in FIG. 2, a transfer conveyor assembly 70 is positioned adjacent to the lateral edge 66 of the conveyor belt 38. Thus, as the article 32 travels along the primary conveyor assembly 36, the guide assembly 68 forces the article 32 laterally onto the transfer conveyor assembly 70 as will be discussed in greater detail below.

Referring now to FIGS. 2 and 3, the guide assembly 68 generally includes a guiding conveyor belt 72 entrained about a drive pulley 74 and a pair of idler pulleys 76. The drive pulley 74 is coupled to the second drive shaft 58 through a right angle gear box assembly 78, as shown in FIG. 3. In this manner, the motor 52 is able to drive both the primary conveyor assembly 36 and the guiding conveyor belt 72 of the guide assembly 68. Gearbox assembly 78 is geared at a 1:1 ratio, such that primary conveyor belt 38 and guiding conveyor belt 72 are driven at the same speed in response to operation of motor 52.

An angled portion 79 of the guide assembly 68 is in the form of angled run of guiding conveyor belt 72 which extends transversely across the primary conveyor belt 38 between lateral edge 65 and a position spaced slightly inwardly from the lateral edge 66. The angled run of the guiding conveyor belt 72 is defined by a lower guide rail 80 and upper guide rail 82, as can best be seen in FIG. 4. The upper and lower guide rails 80 and 82 are each supported by several support posts 84 that extend downwardly from a support frame 86 for the article reorientation mechanism 30, as shown in FIG. 4.

Figure 6:
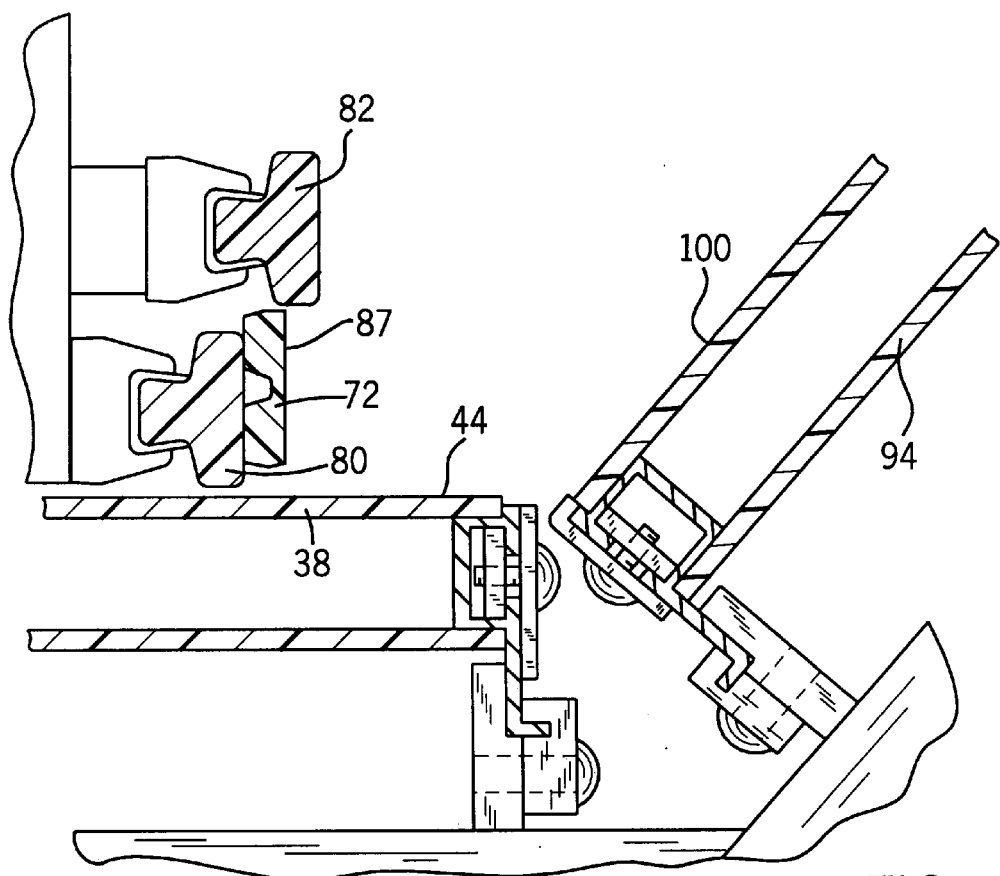
FIG. 6 is an enlarged partial section view showing the positioning of a primary conveyor assembly, a transfer conveyor assembly, and a guide conveyor assembly of the present invention.

As can be seen in FIG. 6, the guiding conveyor belt 72 rides along the lower guide rail 80 such that the lower guide rail 80 defines the path of the guiding conveyor belt 72 in the angled portion 79. The guiding conveyor belt 72 includes a guide run 87 that contacts the article 32. In the preferred embodiment of the invention, the guide run 87 is oriented normally to the conveyor run 44 of the primary conveyor belt 38, as shown in FIG. 6. The upper guide rail 82 is positioned above the lower guide rail 80 and slightly outward from the lower guide rail 80. In this manner, the upper guide rail 82 prevents the article 32 from jumping over the conveyor belt 72 being guided by the lower guide rail 80.

Each of the idler pulleys 76 is mounted to a shaft 88 as shown in FIG. 4. Each shaft 88 is rotatably mounted between a pair of bearing assemblies 90, each of which is attached to a mounting bracket 92. Each mounting bracket 92 in turn is secured to a portion of the support frame 86, as shown in both FIGS. 4 and 5.

As can be seen in FIG. 2, as the article 32 is moved toward the downstream end 42 of the primary conveyor upper run 44, the article 32 contacts the angled portion 79 of the guide assembly 68. Since the guiding conveyor belt 72 is angled across the primary conveyor belt 38 by the angled portion 79, the guiding conveyor belt 72 forces the article 32 to slide laterally along the primary conveyor belt 38 toward the lateral edge 66. The transfer conveyor assembly 70 is positioned adjacent to the lateral edge 66 such that the article 32 is pushed onto the transfer conveyor assembly 70 by the guide assembly 68, as shown in FIG. 4.

As shown in FIG. 2, the transfer conveyor assembly 70 includes an endless transfer conveyor belt 94 entrained to move between an upstream end 96 and a downstream end 98. Referring back to FIG. 4, the transfer conveyor belt 94 includes a transfer run 100 that contacts and moves the article 32 as the article 32 is pushed onto the transfer conveyor assembly 70 by the guide assembly 68. The lower end of transfer conveyor belt 94 at transfer run 100 is located below the upper surface of upper conveyor run 44 of primary conveyor belt 38, to ensure that article 32 does not catch on the lower end of transfer conveyor belt 94 as it moves laterally off of primary conveyor belt 38.

The transfer conveyor belt 94 of the transfer conveyor assembly 70 is driven by a motor 102. The motor 102 is coupled to a drive roller 104 through a conventional pulley and belt assembly (not shown) positioned beneath cover 106. The pulley and belt assembly positioned beneath cover 106 is similar to the drive assembly described in connection with the primary conveyor assembly 36. In the preferred embodiment of the invention, the motor 102 operates to drive the transfer conveyor belt 94 at a speed substantially equal to the speed of primary conveyor belt 38 and guiding conveyor belt 72, such that when the article 32 is pushed onto the transfer conveyor belt 94 of the transfer conveyor assembly 70, the article 32 does not slide along the transfer run 100.

The transfer conveyor assembly 70 is mounted to the support frame 86 by a series of supports 108. As can be seen in FIG. 4, the supports 108 are connected at an angle relative to the support frame 86, such that the transfer conveyor belt 94, and thus the transfer run 100, are positioned at an angle relative to the generally horizontal primary conveyor belt 38 and upper conveyor run 44. Thus, as the article 32 is pushed onto the transfer run 100, the article 32 is positioned at an angle relative to horizontal. The angle of the article 32 relative to horizontal increases as the article moves closer to the downstream end 42, since the article 32 is pushed further onto the transfer run 100 by guiding conveyor belt 78 at angled portion 79. In the preferred embodiment of the invention, the angle defined by the transfer run 100 and the upper conveyor run 44 may be approximately 140°. However, it is understood that transfer run 100 may be at any other angle relative to upper conveyor run 44, so long as the angle defined therebetween is greater than 90° and less than 180°. Preferably, the angle defined by transfer run 100 and upper conveyor run 44 is such that the article 32 is prevented from prematurely tipping onto one of its side surfaces 50 on the conveyor run 44.

Referring back to FIG. 2, it is important to note that the angle of the guide assembly angled portion 79, including the lower guide rail 82, across the primary conveyor belt 38 of the primary conveyor assembly 36 must be selected to prevent articles 32 from being pushed off the lateral edge 66 before the upstream end 96 of the transfer conveyor assembly 70. Specifically, the distance between the guiding conveyor belt 72 of the guide assembly 68 and the lateral edge 66 must be greater than the width of any article 32 passing along the primary conveyor assembly 36 at all locations upstream from the upstream end 96 of the transfer conveyor assembly 70. Additionally, it is important that the distance between the guiding conveyor belt 72 and the lateral edge 66 be sufficiently small near the downstream end 98 of the transfer conveyor assembly 70 such that nearly the entire article 32 is pushed onto the transfer run 100 before the article reaches the downstream end 98 of the transfer conveyor assembly 70.

In the preferred embodiment of the invention, the primary conveyor belt 38 of the primary conveyor assembly 36, the guiding conveyor belt 72 of the guide assembly 68, and the transfer conveyor belt 94 of the transfer conveyor assembly 70 are all operated at substantially the same speed. As the article 32 moves along the article reorientation mechanism 30, the article 32 does not slide across any of the conveyor belts. Thus, the outer printed or finished surface of the article 32 is not damaged or marred during processing of the article 32 in the article reorientation mechanism 30.

As can be seen in FIG. 4, as the article 32 is pushed onto the transfer run 100 of transfer conveyor belt 94, the amount of surface contact between the face surface 48 of the article 32 and the upper conveyor run 44 of the primary conveyor belt 38 is substantially decreased. Specifically, a first corner 107 of the article 32 remains in contact with the upper conveyor run 44, while a second corner 109 is pushed into contact with the transfer run 100. Since transfer conveyor belt 94 and the primary conveyor belt 38 are operated at substantially identical speeds, the article 32 is prevented from twisting or skewing, which avoids possible jamming in the article reorientation mechanism 30. Additionally, as the article 32 continues to tilt upright, the corner of the article 32 adjacent corner 107 contacts the guiding conveyor belt 72. Again, guiding conveyor belt 72 is operated at substantially the same speed as both the transfer conveyor belt 94 and primary conveyor belt 38, such that the article 32 moves smoothly along the article reorientation mechanism 30.

When the article 32 reaches the downstream end 98 of the transfer conveyor assembly 70, the article 32 moves onto a twist guide member 110, as shown in FIGS. 2 and 5. The twist guide member 110 extends between a first end 112 and a second end 114. The first end. 112 is positioned adjacent to the downstream end 98 of the transfer conveyor assembly 70. The first end 112 is positioned at substantially the same angle as that of transfer run 100 relative to upper conveyor run 44 of the transfer conveyor assembly 70, such that the article 32 makes a smooth transition from the transfer conveyor assembly 70 to the twist guide member 110. The second end 114 of the twist guide member 110 is generally vertical, as shown in FIG. 5. A smooth curved guide surface 116 extends between the first end 112 and the second end 114 of the twist guide member 110, such that the article 32 can smoothly slide along the guide surface 116. The angle of the guide surface 116 relative to horizontal increases from the first end 112 to the second end 114. As shown in FIG. 5, the corner 107 of article 32 is in contact with the conveyor surface 44 of primary conveyor belt 38 as the article reaches the twist guide member 110, such that the article 32 continues to move toward the downstream end 42 of the primary conveyor assembly 36.

As the article 32 moves along the guide surface 116, the leading upper corner of article 32 engages guide surface 116, which functions to tip article 32 upright until the weight of the article 32 tips the article completely onto its side surface 50. When the article 32 is supported by its side surface 50, the upper guide rail 82 contacts the face surface 46 to support the article 32 in the upright position. When in the upright position, the side surface 50 contacts the upper conveyor run 44 of the primary conveyor belt 38, such that the primary conveyor belt 38 continues to move the article 32 toward the downstream end 42 of the primary conveyor assembly 36.

Since the transfer conveyor assembly 70 is positioned at an angle relative to the horizontal primary conveyor belt 38, the twist guide member 110 can quickly tip the article 32 onto its side surface 50 after the article 32 leaves the transfer conveyor assembly 70. In this manner, the twist guide member 110 causes little or no damage to the outer surface of the article 32.

After being tipped upright by the twist guide member 110, the article 32 enters a lane 118 formed by a pair of guide rails 120 and 122. The lane 118 is sized to support the article 32 in the upright position to prevent the article 32 from tipping back onto either of its face surfaces 46 or 48. After reaching the downstream end 42 of the article reorientation mechanism 30, the article 32 is transferred onto an outfeed conveyor 124 for further downstream processing in the article sorting and conveying system 10, as previously discussed with reference to FIG. 1.

The article reorientation mechanism 30 of the present invention is thus able to reorient an article 32 from one of its face surfaces 46 or 48 to its side surface 50 as the article 32 is moved by a primary conveyor assembly 36. As discussed, the article reorientation mechanism 30 utilizes three independent conveyor belts all operating at substantially identical speeds to prevent damage to the article as the article is reoriented. Additionally, the article reorientation mechanism 30 positively engages a portion of the article during the entire reorientation process to aid in the reliability of the entire reorientation process and to ensure rapid and consistent movement of the articles therethrough.

Various alternatives and embodiments are contemplated as being within the scope of the following claims particularly pointing out and distinctly claiming the subject matter regarded as the invention.

I claim:

1. A mechanism for reorienting an article from a first surface of the article to a second surface of the article as the article moves from an upstream end of the mechanism to a downstream end of the mechanism, the mechanism comprising:
   a primary conveyor assembly for moving the article from the upstream end to the downstream end of the mechanism, the primary conveyor assembly having a primary conveyor run defined by opposed lateral edges, the primary conveyor run supporting the first surface of the article at the upstream end of the mechanism;
   a transfer conveyor assembly positioned adjacent to one of the lateral edges of the primary conveyor run, the transfer conveyor assembly including a transfer conveyor run oriented at an angle relative to the primary conveyor run;
   a guide assembly positioned to move the article on the primary conveyor run onto the transfer conveyor run as the article travels between the upstream end and downstream end of the mechanism; and
   a guide member positioned downstream from the transfer conveyor run for receiving the article from the transfer conveyor run and tipping the article such that the second surface of the article is supported on the conveyor run of the primary conveyor assembly at the downstream end of the mechanism.

2. The mechanism of claim 1 wherein the primary conveyor run faces upwardly and wherein the transfer conveyor run is oriented such that the primary conveyor run and the transfer conveyor run cooperate to define an obtuse angle.

3. The mechanism of claim 2 wherein the guide assembly includes an angled portion which extends across the primary conveyor run from one of the lateral edges of the primary conveyor run toward the transfer conveyor run.

4. The mechanism of claim 3 wherein the guide assembly includes an endless guiding conveyor belt having a guide run positioned normally to the primary conveyor run.

5. The mechanism of claim 4 wherein the angled portion of the guide assembly includes a guide rail, wherein the guide rail is positioned to contact the endless guiding conveyor belt.

6. The mechanism of claim 1 wherein the guide member includes a first end and a second end, the first end being positioned at an angle relative to the primary conveyor run approximately identical to the angle of the transfer conveyor run, and the second end of the guide member extending substantially normally to the primary conveyor run.

7. A mechanism for reorienting an article from a first surface to a second surface as the article moves from an upstream end of the mechanism to a downstream end of the mechanism, the mechanism comprising:
   a primary conveyor assembly extending between the upstream end and the downstream end of the mechanism, the primary conveyor assembly having a primary conveyor belt defining an upwardly facing primary conveyor run defined by opposed lateral edges, the primary conveyor run contacting the first surface of the article at the upstream end of the mechanism;
   a transfer conveyor assembly positioned adjacent to one of the lateral edges of the primary conveyor run, the transfer conveyor assembly including a transfer conveyor belt having a transfer run oriented at an angle relative to the primary conveyor run;
   a guide assembly including an endless conveyor belt defining a guide run positioned transversely across the primary conveyor run to guide the article on the primary conveyor run into engagement with the transfer conveyor run; and
   a twist guide member positioned adjacent to the transfer conveyor assembly for receiving the article from the transfer conveyor run, wherein the twist guide member tips the article such that the second surface of the article contacts and is supported by the primary conveyor run at the downstream end of the mechanism.

8. The mechanism of claim 7 wherein the guide assembly includes a guide rail with which the endless conveyor belt of the guide assembly is engaged, wherein the guide rail extends across the primary conveyor run in a direction from one lateral edge toward the opposed lateral edge, and wherein engagement of the guide assembly endless conveyor belt with the guide rail defines the guide run of the guide assembly.

9. The mechanism of claim 7 wherein the twist guide member extends between a first end and a second end, the first end being positioned at an angle relative to the conveyor run approximately equal to the angle of the transfer run, and the second end of the twist guide member being substantially perpendicular to the primary conveyor run.

10. The mechanism of claim 7 wherein the primary conveyor belt, the transfer conveyor belt, and the guide assembly conveyor belt all operate at substantially the same speed.

11. The mechanism of claim 7 wherein the guide run extends across the primary conveyor run between the lateral edges of the primary conveyor run.

12. A method of reorienting an article from a first surface to a second surface comprising the steps of:
   positioning the first surface of the article on a primary conveyor surface defined by a primary conveyor assembly;
   operating the primary conveyor assembly to move the article from an upstream end to a downstream end, wherein the article rests on its first surface at the upstream end;
   guiding the article laterally along the primary conveyor surface toward a lateral edge of the primary conveyor surface as the article moves from the upstream end toward the downstream end;
   moving the article onto an angled transfer surface as the article is guided laterally along the primary conveyor surface; and
   moving the article from the angled transfer surface onto a guide member which guides the article such that the second surface of the article is supported by the primary conveyor surface at the downstream end.

13. The method of claim 12 wherein the step of moving the article onto the angled transfer surface is carried out by positioning a guide conveyor assembly diagonally across the primary conveyor surface such that the guide conveyor assembly moves the article on the primary conveyor surface toward the lateral edge of the primary conveyor surface.

14. The method of claim 13 further comprising the step of operating the primary conveyor assembly and the guide conveyor at assembly substantially identical speeds.

15. The method of claim 12 wherein the step of moving the article onto the angled transfer surface comprises moving the article onto a transfer conveyor assembly having a transfer surface oriented at an angle relative to the primary conveyor surface.

16. A method of reorienting an article from a first surface to a second surface, the method comprising the steps of:
   positioning the article on its first surface at an upstream end of a primary conveyor assembly;
   operating the primary conveyor assembly to move the article from the upstream end to a downstream end of the primary conveyor assembly;
   moving the article laterally across the primary conveyor assembly toward a lateral edge of the primary conveyor assembly;
   moving an edge of the article from the primary conveyor assembly and onto a transfer conveyor assembly;
   operating the transfer conveyor assembly to move the article toward the downstream end of the primary conveyor assembly; and
   receiving the first surface of the article on a twist guide member positioned adjacent to the transfer conveyor assembly, wherein the twist guide member tips the article such that the second surface of the article is supported on the primary conveyor assembly.

17. The method of claim 16 wherein the step of moving the article laterally across the primary conveyor assembly is carried out so as to move the article increasingly into engagement with the transfer conveyor assembly as the article moves toward the downstream end of the primary conveyor assembly.

18. The method of claim 16 further comprising the step of positioning the transfer conveyor assembly at an angle relative to the primary conveyor assembly.

19. The method of claim 16 wherein the step of moving the article across the primary conveyor assembly includes positioning a guide conveyor assembly diagonally across the primary conveyor assembly such that the guide conveyor assembly forces the article positioned on the primary conveyor assembly toward the transfer conveyor assembly.

20. A mechanism for tipping an article upwardly from a first surface defined by the article, comprising:
   a primary conveyor assembly defining an upwardly facing primary conveying run oriented in a first plane and extending between an upstream end and a downstream end for engaging the first surface of the article;
   a transfer arrangement having a planar transfer surface defining a length and lying in a second plane throughout its length, wherein the second planes of the planar transfer surface extends upwardly at an obtuse angle relative to the first plane of the primary conveying run; and
   a guide arrangement oriented to move the article laterally on the primary conveying run and into engagement with the transfer surface while maintaining engagement of the article with the primary conveying run, wherein the angle of the transfer surface is operable to tip the article upwardly as the article travels on the transfer surface toward a downstream end defined by the primary conveyor assembly.

21. The mechanism of claim 20 further comprising a twist guide member located at a downstream end defined by the transfer arrangement, wherein the twist guide member defines a guide surface which engages the article as the article is moved by the primary conveying run and positions the article such that the article is supported on the primary conveying run by a second surface distinct from the first surface.

* * * * *